US007436970B2

(12) United States Patent
Mercs et al.

(10) Patent No.: US 7,436,970 B2
(45) Date of Patent: Oct. 14, 2008

(54) MULTI-MODE LED INDICATORS FOR RECORDING DEVICES

(75) Inventors: James Mercs, Huntington Beach, CA (US); Ara Derderian, Rancho Cucomonga, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 895 days.

(21) Appl. No.: 09/965,596

(22) Filed: Sep. 26, 2001

(65) Prior Publication Data

US 2002/0009205 A1 Jan. 24, 2002

Related U.S. Application Data

(63) Continuation of application No. 08/999,642, filed on Sep. 24, 1997, now Pat. No. 6,317,503.

(51) Int. Cl.
*H04B 1/00* (2006.01)
*G10H 7/00* (2006.01)

(52) U.S. Cl. ........................... 381/119; 84/625; 84/660

(58) Field of Classification Search .................. 381/19, 381/119, 61, 123, 124; 84/625, 660, 697; 387/119; 369/4
See application file for complete search history.

(56) References Cited

U.S. PATENT DOCUMENTS 4,879,751 A * 11/1989 Franks et al. ............... 381/119
5,177,801 A 1/1993 Shoda et al. ................ 381/119
5,257,317 A * 10/1993 Stavrou ...................... 381/119
5,319,359 A * 6/1994 Zampini et al. ........ 340/815.45
5,444,789 A * 8/1995 Zampini et al. ............ 381/119
5,488,669 A 1/1996 Zampini et al. ............ 381/119
5,608,807 A * 3/1997 Brunelle ..................... 381/119
5,774,566 A 6/1998 Huber et al. ................ 381/119
5,803,579 A * 9/1998 Turnbull et al. ............ 362/516

* cited by examiner

*Primary Examiner*—Xu Mei
(74) *Attorney, Agent, or Firm*—Blakely, Sokoloff, Taylor Zafman LLP

(57) ABSTRACT

A method and apparatus for indicating the status of a track in a multi-track recorder is described. An indicator light capable of outputting different colored lights is used to indicate the status of a track in the multi-track recorder. The color and the blinking sequence of the indicator light indicates the status of the track.

21 Claims, 3 Drawing Sheets

| Mode | Play | Reverse Play | Fast Forward | Rewind | Stop | Record |
|---|---|---|---|---|---|---|
| Ready Auto Input On | Blink Red | Blink Red | Blink Red | Blink Red | Blink Red & Green * | Solid Red |
| Ready Auto Input Off | Blink Red | Blink Red | Blink Red | Blink Red | Blink Red | Solid Red |
| Monitor | Solid Green | Solid Green | Solid Green | Solid Green | Solid Green | Solid Green |
| Slip Channels | Solid Amber | Solid Amber | Solid Amber | Solid Amber | Solid Amber | Solid Amber |
| Locate Edits | Solid Amber | Solid Amber | Solid Amber | Solid Amber | Solid Amber | Solid Amber |
| Input/Output Gain Adjustment | Solid Amber | Solid Amber | Solid Amber | Solid Amber | Solid Amber | Solid Amber |

(Transport: 304; 300; 320; Play 308; Reverse Play 310; Fast Forward 312; Rewind 314; Stop 316; Record 318; rows 322, 324, 326, 328, 330, 332)

* Indicates that we are listening to inputs

300

| Mode 320 | Transport 304 | | | | | |
|---|---|---|---|---|---|---|
| | *Play* 308 | *Reverse Play* 310 | *Fast Forward* 312 | *Rewind* 314 | *Stop* 316 | *Record* 318 |
| Ready Auto Input On 322 | Blink Red | Blink Red | Blink Red | Blink Red | Blink Red & Green * | Solid Red |
| Ready Auto Input Off 324 | Blink Red | Blink Red | Blink Red | Blink Red | Blink Red | Solid Red |
| Monitor 326 | Solid Green | Solid Green | Solid Green | Solid Green | Solid Green | Solid Green |
| Slip Channels 328 | Solid Amber | Solid Amber | Solid Amber | Solid Amber | Solid Amber | Solid Amber |
| Locate Edits 330 | Solid Amber | Solid Amber | Solid Amber | Solid Amber | Solid Amber | Solid Amber |
| Input/Output Gain Adjustment 332 | Solid Amber | Solid Amber | Solid Amber | Solid Amber | Solid Amber | Solid Amber |

* Indicates that we are listening to inputs

FIG 3

MULTI-MODE LED INDICATORS FOR RECORDING DEVICES

This is a continuation of U.S patent application Ser. No. 08/999,642, filed Sep. 24, 1997, now U.S. Pat. No. 6,317,503.

BACKGROUND OF THE INVENTION

1. Field of the Invention

The present invention relates to output displays for multi-track recorders. More particularly, the application relates to a method and apparatus for indicating modes of operation of each individual track in a multi-track recording system.

2. Related Art

Recording studios have traditionally used multi-track recording systems to record elements of a production. Each element is recorded on a corresponding track in the recording system. Each multi-track recorder typically handles eight to sixteen tracks per recorder. A mixer may control multiple networked multi-track recorders. Thus, a recording engineer may monitor over a hundred tracks in a network.

Each track of the multi-track recording system is typically connected to one control of a mixer. Each track may be individually controlled, thus a track may have its gain independently increased or decreased. Each track may also be "slipped" relative to other tracks in the system. In such a slipped mode, the track may be repositioned in time with reference to the other tracks.

The number of tracks and the variety of independent controls makes it very difficult for a recording engineer to coordinate and monitor the status of each individual track. For example, it is difficult to tell when a particular track in the multi-track system is recording or playing. Each track typically has a corresponding level meter using a plurality of level lights indicating the signal strength of the information being received or output by the corresponding track. The level meters are, in one embodiment, a plurality of light emitting diodes.

Prior art multi-track recording systems required that the recording engineer check a series of switches to determine whether a particular track was recording, playing, or stopped. The recording engineer is also required to check switch settings to determine whether level meters are outputting the signal strength of recorded material or whether the level meters are outputting the signal strength of signals being received by the multi-track recording system. Whether the track is ready for monitoring, whether a particular track is suitable for edits or whether a track was slipped (repositioned in time with respect to other tracks) were also determined by checking switches. Determining the status of many tracks by checking switch positions for a large number of tracks is cumbersome. Thus, a compact method and apparatus for quickly assessing the status of a track is desirable.

BRIEF SUMMARY OF THE INVENTION

A method and apparatus for indicating the status of a track in a multi-track recorder. In particular, an indicator light capable of outputting different colored lights is used. The indicator light corresponds to a track in the multi-track recorder. The color and the blinking sequence of the indicator light indicates a status of the track.

BRIEF DESCRIPTION OF THE DRAWINGS

FIG. 3 is a chart of the modes of the multi-track recording system and the transport status with a corresponding LED indication color.

DETAILED DESCRIPTION OF THE INVENTION

Figure 1:
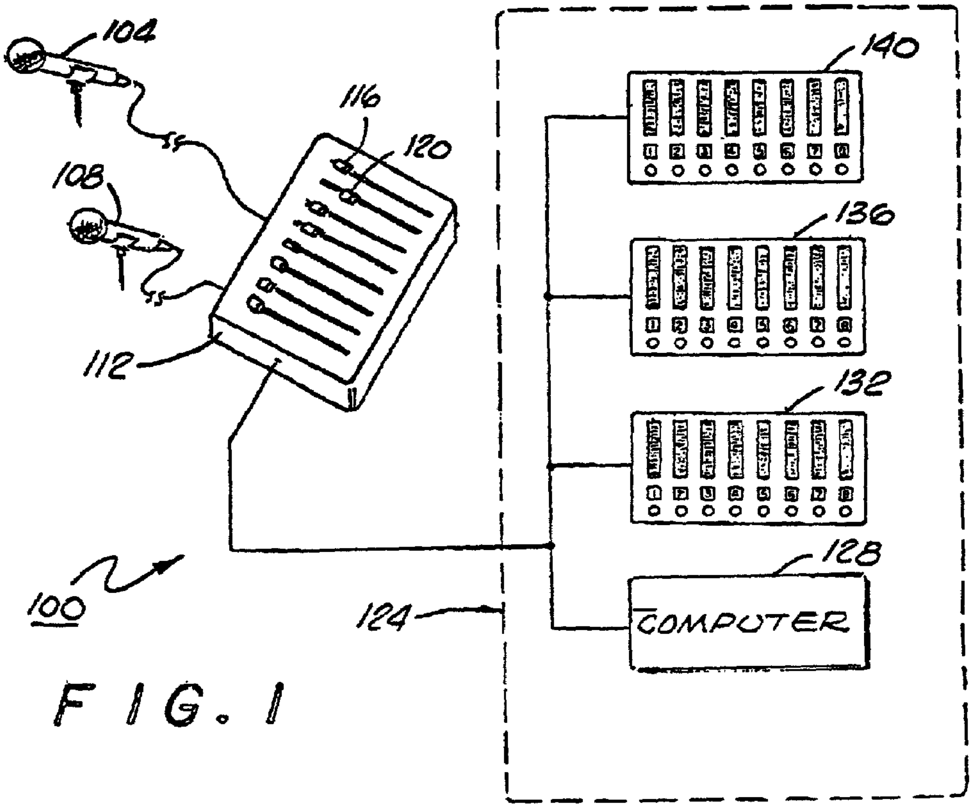
FIG. 1 is a block diagram of an overall multi-track recording system as used in a studio environment.

FIG. 1 illustrates an overall recording system 100 including a receiving device such as microphones 104, 108 which receive a sound signal from a source (not shown). The microphones 104, 108 transfer the signal to a mixer 112. Mixer 112 typically has a plurality of individual controls 116, 120. A recording engineer uses each individual control 116, 120 to adjust the gain to a corresponding individual track being recorded.

In one arrangement, the output of the mixer is transferred to a multi-track recorder. In more sophisticated set-ups, the output of the mixer 112 is transferred to a network 124. Network 124 may include a network manager such as a computer system or other networking device 128 which coordinates the flow of data to a series of multi-track recording devices 132, 136, 140. Networking device 128 may include a resource manager and/or a remote client program. The network device runs software which monitors and controls the inputs to the various multi-track recording devices 132, 136, 140. The network device 128 may be implemented using a multi-track recorder or using a computer.

Figure 2:
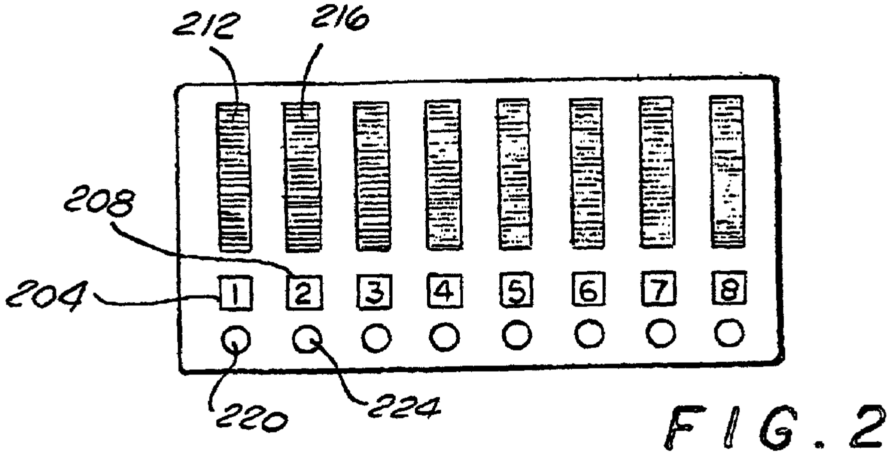
FIG. 2 is an example of a display of a multi-track recording system.

FIG. 2 illustrates one configuration of a recording display for multi-track recorders 132, 136, 140. The recording display 200 includes track displays 204, 208 which identify track numbers corresponding to nearby level meters 212, 216. Track displays 204, 208 are typically silk-screened numbers on a display panel 200. Level meters 212, 216 are typically used to display the signal strength of a signal corresponding to a track. The signal strength displayed by level meters 212, 216 may be the recorded level of the track. Alternately, the level meters may be used to indicate the signal strength of a signal being received from the microphones or the mixer 112. In a record mode, the signal received from the microphones or the mixer 112 is the signal which is recorded.

Indicator lights 220, 224 positioned in close proximity to track display 204, 208 and level meters 212, 216 are used to identify the mode or operation of the track. By varying the color of the indicator light or the (blinking sequence) of the indicator lights 220, 224 a recording engineer can quickly identify the status of a particular track without referring is multiple indicators at different areas of the workplace.

Indicator lights 220, 224 may be implemented in different ways. In one embodiment, two light emitting diodes (LEDs) are placed in close proximity to each other in a single transparent housing. The transparent housing makes it appear as if the two LEDs are one single LED light. The housing including both LEDs form the indicator light 220, 224. When one LED is switched on, the indicator light 220 outputs the color of the first LED. When a second LED is switched on and the first LED turned off, the indicator light 220 indicates the color of the second LED. When both LED's are switched on, the indicator light 220 outputs a color which is the combination of the two LEDs. Thus, if the first LED is red and the second LED is green, the combination of the two LED's together will make indicator light 220 appear as orange or amber colored.

FIG. 3 illustrates a chart showing the output of indicator lights 220 corresponding to the status of a track. The status of a track takes into account transport movement and the mode of a track. In traditional designs, a transport mechanism of the multi-track recorder device moves a recording tape across the recording heads of a multi-track recording device. In digital recording systems, an actual transport mechanism may move a tape or other mechanisms may be used for recording digital information; however, even in recorders without a moving tape, the data is digitally manipulated to simulate traditional play, reverse, rewind, stop and record functions.

The status of the transport mechanism is horizontally displayed in chart 300. In play mode 308, previously recorded material is output to the level meters 212, 216 and connected speakers. In reverse play 310, the contents of the recorded material is played in reverse. Fast forward 312 quickly forwards through previously recorded material while rewind 314 quickly goes back over previously recorded material. A stop mode 316 places the multi-track recording system in a waiting state. Record mode 318 allows the system to record incoming signals.

Non-transport related modes of the multi-track recorder device are shown in a vertical column entitled MODE 320. In a READY AUTO INPUT ON mode 322, the user is listening to recorded material in all modes except stop. When the stop mode is used with the ready auto input on mode, the multi-track recording system outputs an "input signal" received from a source external to the multi-track recorder. When the multi-track recording system is in a ready mode but the AUTO INPUT OFF mode 324 is active, the output of the multi-track recording device is the prerecorded material. When the multi-track recording device transport is stopped 316, while a track is in an AUTO INPUT OFF mode, the multi-track recording device outputs silence.

A MONITOR MODE 326 allows the user to set-up or to enter tracks to be mixed into a headphone or other output device. Other modes which allow manipulation of data are SLIPPING CHANNELS mode 328 which allows tracks to be displaced with respect to a referenced time and LOCATE EDITS 330 mode which allows rapid finding of edit points. An INPUT/OUTPUT gain adjustment 332 mode allows a user to adjust the gain of a selected track.

The colors indicated in chart 300 indicate the output of an indicator light for a particular combination of transport 304 modes and non-transport modes 320. In general, the ready mode corresponds to a first color, (red in the example) the monitor mode corresponds to a second color (green in the example) and edit mode such as slip track and locate edits correspond to a third color (amber in the example). A blinking light and a solid light may also be used to indicate whether the transport is playing, fast-forwarding or recording. When the user is listening to recorded material and the track is armed (ready to record), the indicator light blinks red.

Alternating different colored lights may also indicate a transport mode and non-transport mode combination. For example, when the transport 304 is stopped and the non-transport mode is in a READY AUTO INPUT ON state, the indicator light blinks a first color and a second color in an alternating sequence. In the described embodiment, the alternating sequence indicates that the system is ready to record or play, but the transport is currently stopped. The alternating blinking sequence also indicates that corresponding level meters are outputting the level of an input signal which is not being recorded. The blinking indication avoids confusion regarding whether the level meter output is material recorded on the tape.

Figure 4:
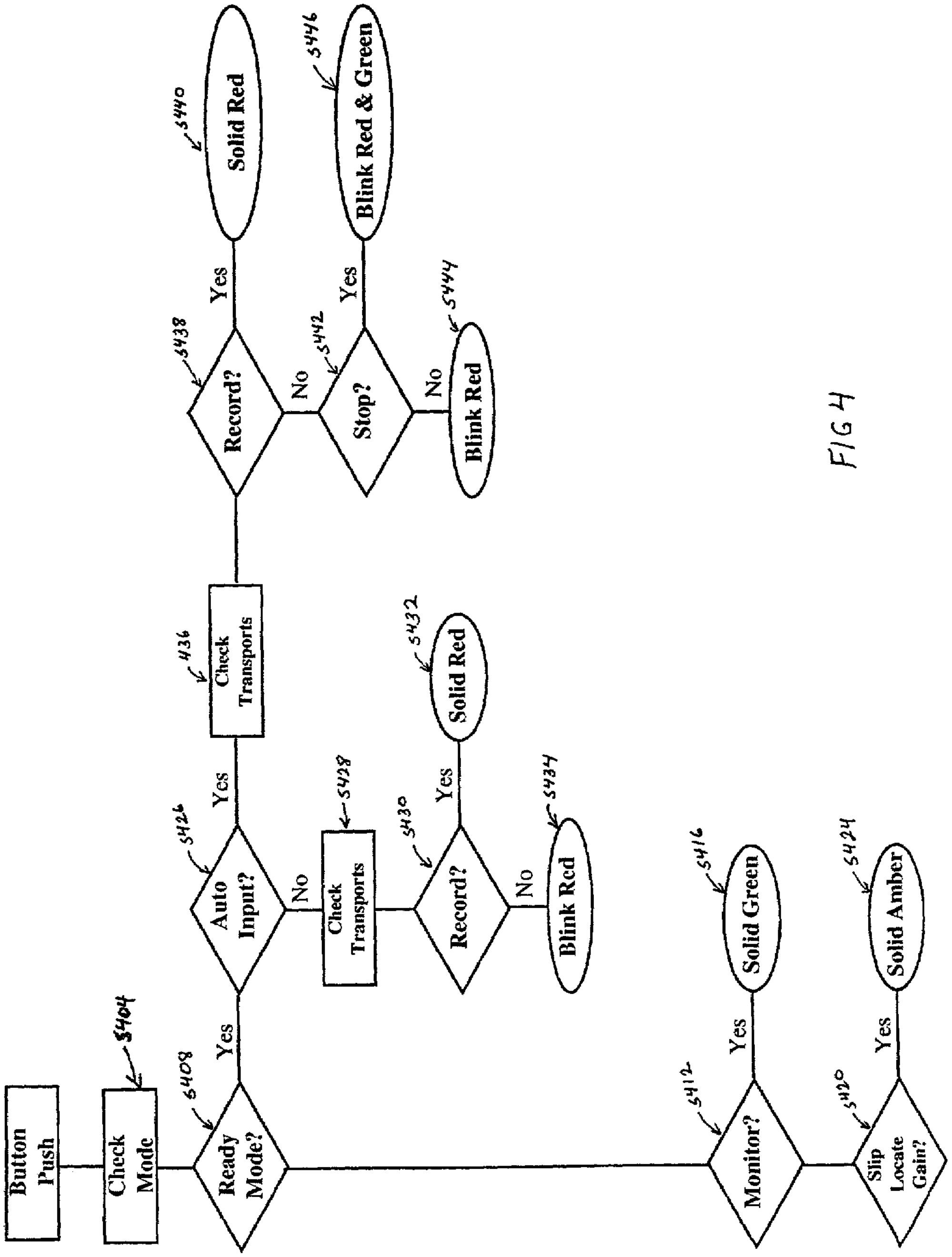
FIG. 4 is a flow diagram illustrating the step executed by software in the present invention.

FIG. 4 is a flow chart indicating the steps typically taken by a processor running a software program to implement the invention. In one embodiment, the software program runs on a processor in the multi-track recording device or the networking device 128. In step S404, the processor checks the non-transport mode of the multi-track recording device. In step S408, the processor determines whether the multi-track recording device is in a ready mode. If in step S412, the multi-track recording device is not in a ready mode but is in a monitor mode, the indicator light outputs a solid green signal in step 416. When an edit mode is detected in step S420, the indicator light outputs a solid amber colored light in step 424.

When the system is in a ready mode as determined in step S408, the processor determines whether the track in the multi-track recording system is in an AUTO INPUT mode in step S426. When the multi-track recorder is not in an AUTO INPUT mode, the transport modes are checked in step S428. When, in step 430, it is determined that the transport mode is in a RECORD mode, the indicator light outputs a solid red color in step S432. A determination that the transport is not in RECORD mode results in a blinking red indicator light output in step 434.

When the multi-track recorder is in a READY AUTO INPUT ON mode, the transport mode is checked in step S436 to determine whether the transport of the multi-track recorder is in a record mode in step S438. When the transport is in a record mode, the indicator light outputs a solid red color in step S440. In step S442, the processor determines whether the transports are stopped. When the transport is not stopped and while the multi-track recorder is in a READY AUTO INPUT ON mode, the indicator light outputs a blinking red signal in step S444. When it is determined in step S442 that the transport is stopped while the multi-track recording device is in a READY AUTO INPUT ON mode, the indicator light outputs an alternating red and green signal in step S446.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A multi-track recording system, comprising a plurality of indicator lights, each indicator light in said plurality of indicator lights corresponding to a track of the multi-track recording system, at least one indicator light of said plurality of indicator lights to collectively output a first color to identify that the system is operating in a first mode where the corresponding track is able to be mixed with other tracks and a second color identifies that the system is operating in a second mode where a user is listening to recorded material including the corresponding track.

2. The multi-track recording system of claim 1 wherein the at least one indicator light is capable of outputting a third color, said third color indicating that the corresponding track is in an edit mode in which the system allows the corresponding track to be displaced in time from another track in the multi-track recording system.

3. The multi-track recording system of claim 1 wherein an alternating blinking sequence between two colors indicates a mode that an input signal received from an external source is output while playback of the recorded material is stopped.

4. The multi-track recording system of claim 3 wherein the alternating blinking sequence alternates between the first color and the second color.

5. A method of indicating a mode of each track in a multi-track recording system comprising:

determining the mode of each of the tracks in the multi-track recording system;

activating an indicator light to emit light; and adjusting a color output of the activated indicator light where a first color output by the indicator light corresponds to a first non-transport mode of a corresponding track and a second color output by the indicator light corresponds to a second non-transport mode of the corresponding track, the first non-transport mode being a mode where a user is listening to recorded material and the second non-transport mode being a mode where the user enters tracks to be mixed into an output device.

6. The method of claim 5 wherein the determining of the mode includes determining whether an output signal to a plurality of level meters is derived from a recorded signal on a track of a plurality of recorded tracks or whether the output signal is derived from an external source.

7. The method of claim 5 wherein the adjusting of the color of the indicator light includes varying the output of the indicator light in color according to the mode of the corresponding track with the first color output being different from the second color output.

8. The method of claim 5 wherein the adjusting of the color output of the indicator light includes alternating color in a blinking sequence according to the mode of the corresponding track.

9. The method of claim 5 further comprising:

adjusting the color output of the indicator light where a third color output corresponds to a third non-transport mode of the corresponding track.

10. The method of claim 9 wherein the first non-transport mode being a mode where a user is listening to recorded material, the second non-transport mode being a mode where the user enters tracks to be mixed into an output device and the third non-transport mode being a mode where data associated with the corresponding track is manipulated.

11. The method of claim 9 further comprising:

adjusting the color output of the indicator light where a fourth color output corresponds to a transport mode of the corresponding track.

12. A method of indicating a track status of a track in a multi-track recording system comprising:

determining a type of transport movement of the track in the multi-track recording system;

indicating the type of transport movement of the track by illuminating a first light emitting diode disposed in a housing;

determining a mode of the track in the multi-track recording system; and indicating the mode of the track by illuminating a second light emitting diode in close proximity to the first light emitting diode such that when both the first light emitting diode and the second light emitting diode are activated, a third color is generated to identify that the multi-track recording system is in a mode that allows mixing of the track and adjustment of the track in either time or gain.

13. The method of claim 12, wherein the first light emitting diode and the second light emitting diode alternate between blinking and solid light so as to generate a multiplicity of track status combinations.

14. A system comprising:

a plurality of recording tracks; and a display comprising a plurality of single indicator lights, each single indicator light conveying a monitored status of one corresponding track of the plurality of recording tracks, wherein the monitored status indicates both (i) a type of transport movement indicating one of a group comprising a plurality of simulated functions including Play, Reverse Play, Fast Forward, Rewind, Stop, and Record and (ii) a mode of the one corresponding track, the mode being a mode where a user is listening to recorded material or where the user enters tracks to be mixed into an output device.

15. The system of claim 14, wherein the monitored status appears as a solid or repeating pattern of a first color, a second color or a third color produced by a chromatic light combination of the first color and the second color.

16. The system of claim 14, wherein the mode of the track indicates one of a group comprising Read Auto Input On, Ready Auto Input Off, Monitor, Slip Channels, Located Edits, and Input/Output Gain Adjustment.

17. The system of claim 15, wherein the single indicator lights include (i) a first light emitting diode (LED) to output the first color, (ii) a second light emitting diode (LED) the second color, and (iii) a transparent housing for the first light emitting diode (LED) and the second light emitting diode (LED).

18. The system of claim 17, wherein the first color, the second color and the third color are generated by activating the first LED, the second LED, or a combination of the first and second LEDs positioned in close proximity to one another.

19. The system of claim 14, wherein the display further comprises a level meter corresponding to each indicator light of the plurality of indicator lights.

20. A method indicating a mode of each track in a multi-track recording system comprising:

determining the mode of each of the tracks in the multi-track recording system;

providing at least one indicator light; and adjusting a color output of the indicator light where a first color output corresponds to a first non-transport mode of a corresponding track and a second color output corresponds to a second non-transport mode of the corresponding track, each non-transport mode provides information other than information involving simulated Play, Stop and Record functions;

adjusting the color output of the indicator light where a third color output corresponds to a third non-transport mode of the corresponding track; and adjusting the color output of the indicator light where a fourth color output corresponds to a transport mode of the corresponding tack, the fourth color output being an alternating combination of the first color output and the second color output.

21. A method indicating a mode of each track in a multi-track recording system comprising:

determining the mode of each of the tracks in the multi-tack recording system;

providing at least one indicator light; and adjusting a color output of the indicator light where a first color output corresponds to a first non-transport mode of a corresponding track and a second color output corresponds to a second non-transport mode of the corresponding track; and alternating blinking sequence of the first color output to indicate that the mode of the corresponding track is in a non-recording transport mode; and providing constant illumination of the first color output to indicate that the mode of the corresponding track is in a recording transport mode.

* * * * *